Dec. 25, 1934.  L. E. HODGES  1,985,291

CLUTCH FOR DRAW WORKS

Filed May 19, 1931  2 Sheets-Sheet 1

Inventor
Lester E. Hodges
By Hardway Cathey
Attorneys

Dec. 25, 1934.  L. E. HODGES  1,985,291

CLUTCH FOR DRAW WORKS

Filed May 19, 1931  2 Sheets-Sheet 2

Inventor
Lester E. Hodges
By
Hardway Cather
Attorneys

Patented Dec. 25, 1934

1,985,291

UNITED STATES PATENT OFFICE 1,985,291

CLUTCH FOR DRAW WORKS

Lester E. Hodges, Houston, Tex.

Application May 19, 1931, Serial No. 538,455

3 Claims. (Cl. 192—113)

This invention relates to a clutch.

One object of the invention is to provide, in draw works, a novel type of drum mounted and arranged to be operated in a novel manner.

Another object of the invention is to provide, in a draw works, a drum which is loosely mounted on the drum shaft and which is arranged to be clutched with and declutched from said shaft, preferably by means of internal, expanding friction clutches, one at each end of the drum.

With the above and other objects in view this invention has particular relation to certain novel features of construction, operation and arrangement of parts, an example of which is given in this specification and illustrated in the accompanying drawings, wherein:—

Figure 2:
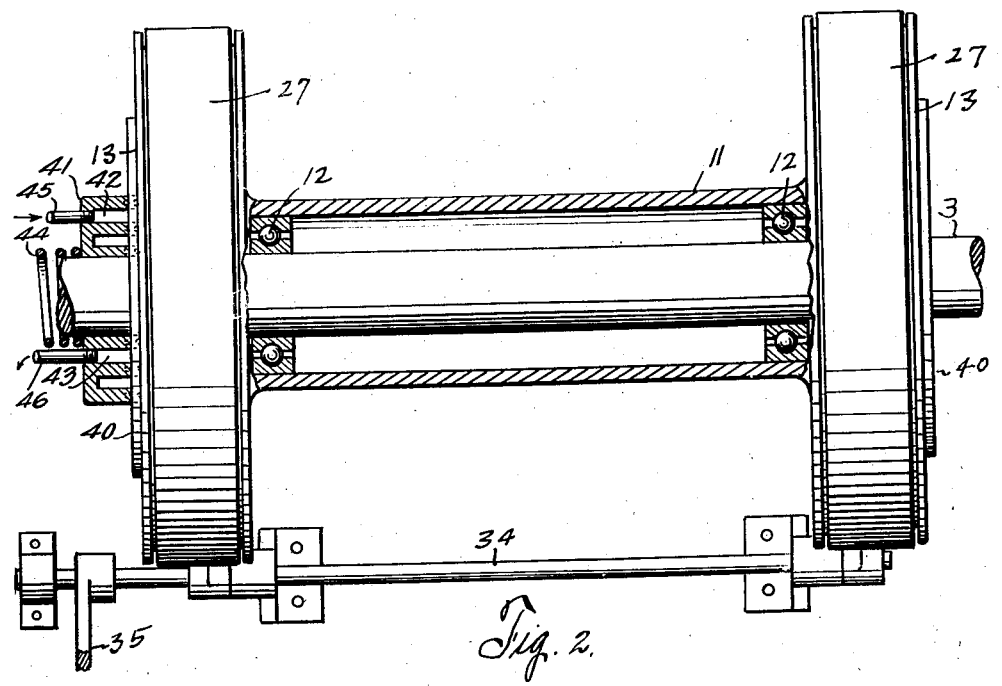
Figure 2 shows a front elevation of the drum, partly in section.
Figure 3:
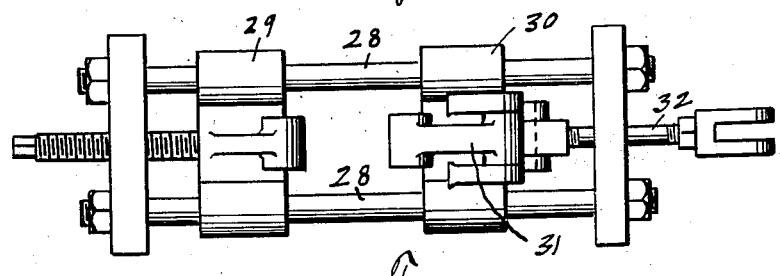
Figure 3 shows a plan view of the operative mechanism of the drum brake.
Figure 1:
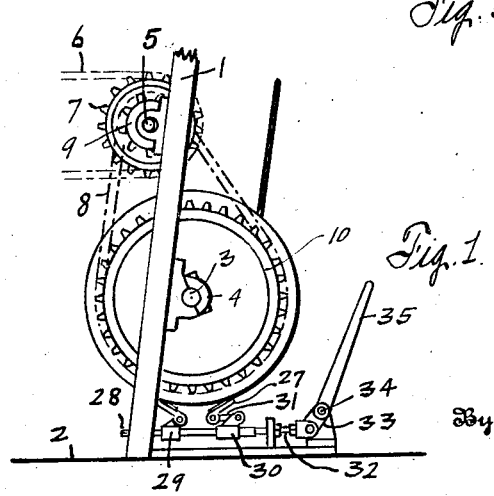
Figure 1 shows a fragmentary end view of a draw works showing the drum mounted therein.
Figure 4:
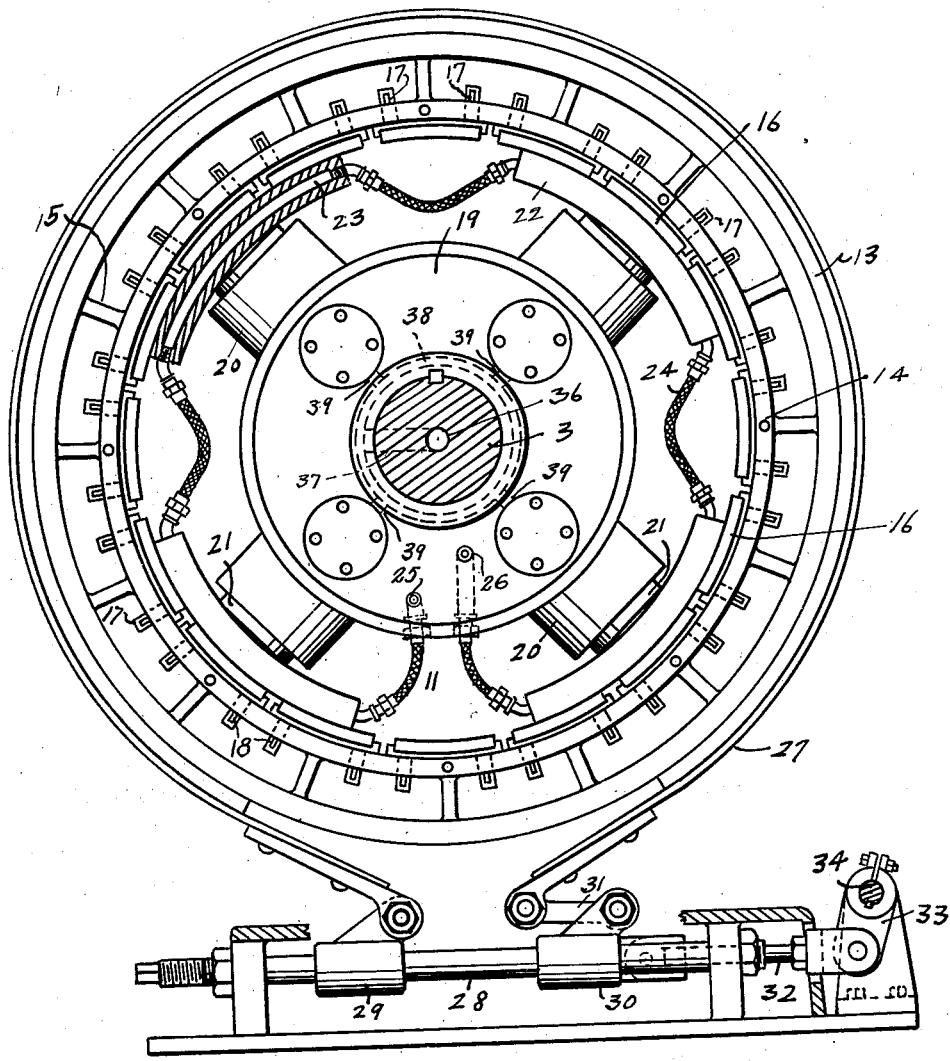
Figure 4 shows an end view of the drum and associated clutch.

Referring now more particularly to the drawings, wherein like numerals of reference designate similar parts in each of the figures, the numeral 1 designates the draw works frame which upstands from the derrick floor 2. The drum shaft 3 is mounted to rotate in suitable bearings 4 carried by said frame 1.

There is a counter shaft 5 mounted to rotate in the frame and driven by a suitable sprocket chain 6 which operates over the sprocket wheel 7 fixed on said shaft 5. The shaft 3 is driven by a sprocket chain 8, which is driven from a sprocket wheel 9 fixed on said shaft 4, and which drives a sprocket wheel 10 fixed on the shaft 3.

There is a drum 11 loosely mounted on the shaft 3 and mounted to run on anti-friction bearings 12, 12. Each end of the drum 11 has an outer brake flange 13 and an inner clutch flange 14 said flanges 13 and 14 being concentric and being anchored together by webs 15.

Within each clutch flange 14 are the clutch shoes 16, spaced apart and anchored in place in any selected manner. As shown each clutch shoe has the outward projections 17 through the flange 14 and keys 18 are fitted through keyways through the outer ends of said projections whereby said shoes may be detachably held in place.

Fixed on the shaft 3 within each flange 14 there is an internal expanding clutch, designated generally by the numeral 19. Any type of friction clutch may be employed but as shown each clutch comprises the radial cylinders 20, having plungers 21, therein, and on the outer ends of these plungers are the clutch members 22 arranged to frictionally engage the shoes 16. Each clutch member is hollow having the chamber 23 therein which is connected by the tubes 24 preferably flexible. An inlet line 25 enters one end chamber and an outlet line 26 leads from the other end chamber, whereby a cooling fluid may be circulated through said clutch members. Suitable means may be provided for introducing fluid under pressure into the cylinders 20, to force the plungers 21 outwardly whereby the drum may be clutched with the shaft 3, and for releasing said pressure to release the clutch.

The operating fluid for operating the clutch may be admitted through an axial bore 36, in the end of the shaft 3 and may pass thence through the radial channel 37 into the annular chamber 38 in the hub of the corresponding clutch. Said chamber 38 connects with the respective cylinders 20 through the corresponding ports 39.

The outer surface of each flange 13 forms a brake surface around which is the brake band 27. There are the tracks 28, 28 whereon there is an adjustable yoke 29 connected to one end of the corresponding band 27 and on this track there is a slidable yoke 30 connected to the other end of said band through the link 31. A brake rod 32 is connected at one end to the yoke 30 and at its other to the arm 33 which is fixed on the brake shaft 34. This shaft may be manipulated and the corresponding brake band applied and released, through the brake lever 35.

The shaft 3 may be driven at different speeds by the conventional driving mechanism now employed for the purpose but the drum 11 will only rotate when one or both of the clutches 19 are engaged.

Annular end plates as 40, 40 may be bolted or otherwise secured on the outer ends of the respective flanges 14 to inclose the clutch mechanism. The ends of the drum 11 will thus be completely closed and the drum bearings and clutches may run in oil.

Any suitable means may be provided for supplying the cooling fluid to the inlet 25 and for relieving the same from the outlet 26. As shown there is a housing 41 loosely mounted on the shaft 3 and having the inlet chamber 42, and the outlet chamber 43. The chamber 42 is constantly in communication with the inlet 25 and the outlet chamber 43 is in constant communication with the outlet 26. The housing may be held closely against the end of the clutch 19 by the means of a coil spring 44, suitable packing being employed if desired to form approximately fluid tight joints between the housing and clutch. An inlet line 45 enters the chamber 42 and a relief line 46 leads from the chamber 43. Only one housing is shown on the drawings but there will be a similar arrangement at the other end of the drum for circulating the cooling fluid through the clutch members at said other end.

The drawings and description disclose what is now considered to be a preferred form of the invention by way of illustration only while the broad principle of the invention will be defined by the appended claims.

What I claim is:—

1. In a clutch, an annular clutch flange, a clutch within said flange having radial cylinders, plungers in said cylinders, a series of clutch members on the outer ends of said plungers having arcuate outer faces arranged to frictionally engage the flange, the members of said series having internal chambers and flexible tubes connecting said chambers.

2. A device of the character described comprising an annular clutch flange, a clutch within the flange having radial cylinders, plungers in said cylinders, a series of clutch members on the outer ends of the plungers having arcuate outer faces arranged to frictionally engage the flange, the members of said series having internal chambers, and tubular connections between the chambers providing for the circulation of a cooling fluid from chamber to chamber.

3. In apparatus of the character having a shaft with a drum thereon having a clutch flange; a clutch on said shaft within said flange and having radial cylinders, plungers in said cylinders, a series of hollow clutch members on the outer ends of the plungers having arcuate outer faces arranged to frictionally engage the flange, means forming tubular connections between the chambers of the clutch member whereby a cooling fluid may be circulated from chamber to chamber.

LESTER E. HODGES.